F. W. KRONE, Jr.
FROST PREVENTING APPARATUS.
APPLICATION FILED NOV. 1, 1910.
994,412.
Patented June 6, 1911.
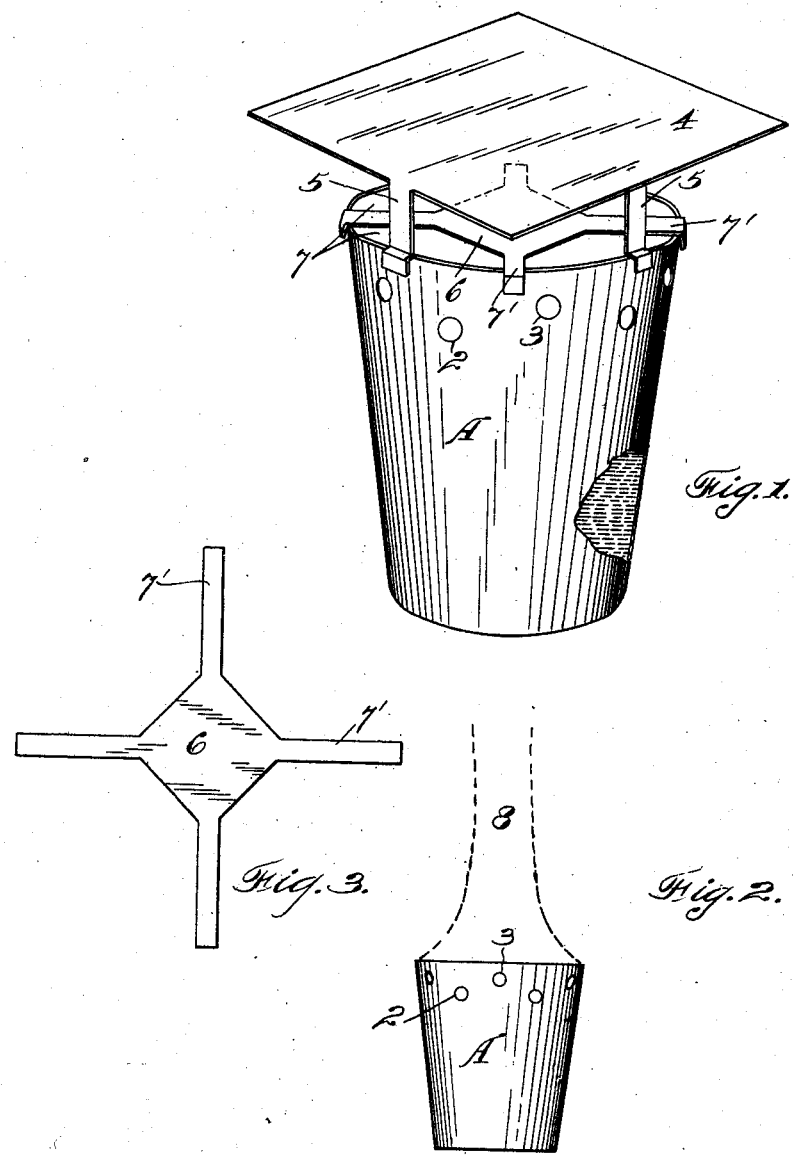
Witnesses;
Inventor;
Frederick W. Krone, Jr.
By Geo. H. Strong
his Atty.

UNITED STATES PATENT OFFICE.

FREDERICK W. KRONE, JR., OF SAN FRANCISCO, CALIFORNIA.

FROST-PREVENTING APPARATUS.

994,412.  Specification of Letters Patent.  Patented June 6, 1911.

Application filed November 1, 1910. Serial No. 590,146.

*To all whom it may concern:*

Be it known that I, FREDERICK W. KRONE, Jr., citizen of the United States, residing in the city and county of San Francisco and State of California, have invented new and useful Improvements in Frost-Preventing Apparatus, of which the following is a specification.

The invention relates to a heating device designed for use in orchards and vineyards, when the normal temperature in the orchard becomes so low that some of the fruit and tender foliage on the trees will freeze, unless the temperature in the orchard is raised artificially.

Various attempts have been made to counteract the damaging effects of frost and low temperatures in orchards and vineyards, many of the appliances used for the purpose being quite expensive, more or less cumbersome and unsatisfactory. As it is uncertain just when the cold periods will occur, it is of the greatest importance that the heating devices shall be readily portable and convenient, and easily used, especially as but a short period of time is allowed for lighting the heaters after the thermometer indicates that a dangerously low temperature has been reached. It is an important object that the device should burn for a sufficient length of time, and yield a maximum amount of heat with a minimum amount of soot.

The present invention pertains especially to a soot gatherer to collect the soot which emanates from the burning oil, and prevents the soot being deposited on the fruit, such as ripening oranges, lemons, and the like which would thereby be detrimentally affected as to their market value.

The object of the present invention is to provide a simple, cheap, practical soot arresting device which is easily adjustable to oil-burning orchard heaters, on top of which heaters these arresters may be adjusted without interfering with the putting on or taking off of the regular cover or cowl of the heater.

The invention consists of the parts and the construction and combination of parts as hereinafter more fully described and claimed, having reference to the accompanying drawings, in which—

Figure 1 is a perspective of the device. Fig. 2 is a diagrammatic view. Fig. 3 is a plan of the soot plate.

A represents a receptacle or pot of appropriate shape, size and material, preferably constructed of sheet metal in the form of a truncated cone adapted to hold a sufficient quantity of oil to burn, by the system of control provided, a sufficient length of time to outlive any damaging frost or sudden drop in temperature prevalent in fruit districts.

Above the center of the pot the sides are perforated by two rows of perforations 2—3; the lower perforations 2 forming carbureting passages for the admission of air sufficient to maintain combustion, and the upper set of perforations 3 providing draft passages so placed that they act as auxiliaries to the passages 2 in promoting and maintaining combustion. The pot is provided with a suitable cowl or cover 4 which substantially covers the top of the pot, but is lifted above the rim of the pot and supported thereon by suitable means, as the legs 5.

The present invention resides especially in the use with a pot, as above described, and with or without the cowl, of a soot gatherer, represented at 6. This soot gatherer consists of a piece of sheet metal of any suitable shape and having an area equal to only a small fraction of the open mouth of the pot, but so disposed centrally of the pot and over the top thereof as to form an obstruction to the upwardly rising column of smoke and flame from the burning oil beneath, yet leave sufficient passages or vents, represented at 7, Fig. 1, between the edges of the plate 6 and the sides of the pot. Usually with a pot, say eight inches in diameter at the top, it would have a soot gatherer about three and one-half inches square, although the form of the plate is not essential. This plate 6 is supported in any suitable means so that it will be flat or approximately level with the top of the heater and about centrally over the mouth of the pot. In practice, a convenient method of supporting the plate is by bendable projections 7' at the corners of the plate which are adapted to rest on the rim of the pot. Whenever the oil is lighted in the pot, the flames, smoke and soot in the absence of this soot gatherer rise in a comparatively narrow column from the center of the pot, as I have attempted to represent at 8, in Fig. 2; this central tendency of the column being due to, or augmented by, the openings 2—3 in the pot, but by disposing the plate 6 centrally over the pot leaving the spaces 7 around the plate 6 for the outlet of the heat, it has been found in actual practice that the soot emanating from the burning oil, collects on the underside of the plate and the flame is spread out from the center in all directions, and only the heat of the burning oil issues through the opening 7. Experience shows that this simple little device increases the period of burning twenty-five per cent. or more, and increases the effectiveness of the heater by reducing the soot and securing better combustion; the advantages being the increased heat and the longer heating period.

The cowl or cover 4 is advantageous because in setting these pots throughout the orchard or vineyard in readiness for use, it is desirable to protect the contents from moisture and dirt, which protection could not be afforded by the plate 6 with its limited area. The cover 4, if laid flat over the pot, serves as an extinguisher when the fire is no longer needed.

Having thus described my invention, what I claim and desire to secure by Letters Patent is—

1. A frost preventing device, consisting of a liquid fuel containing pot having carbureting and draft passages in its sides, and a soot gatherer consisting of a plate disposed centrally over the mouth of the pot and substantially in the plane of the mouth of the pot, and of less area than the mouth of the pot, and separated from the sides of the pot to provide outlet passages for the heat.

2. A frost preventing device, consisting of a liquid fuel containing pot having carbureting and draft passages in its sides, a soot gatherer consisting of a plate disposed centrally over the mouth of the pot and substantially in the plane of the mouth of the pot, and of less area than the mouth of the pot, and separated from the sides of the pot to provide outlet passages for the heat, said soot gatherer supported from the sides of the pot, and a cowl above the soot gatherer and supported above the pot, and covering the same.

In testimony whereof I have hereunto set my hand in the presence of two subscribing witnesses.

FREDERICK W. KRONE, Jr.

Witnesses:
  GEORGE R. COMTÉ,
  FRED H. HAMMER.

---

Copies of this patent may be obtained for five cents each, by addressing the "Commissioner of Patents, Washington, D. C."